(12) United States Patent
Tyhurst et al.

(10) Patent No.: US 10,942,727 B2
(45) Date of Patent: **\*Mar. 9, 2021**

(54) METHOD, SYSTEM AND APPARATUS FOR INSTALLING SOFTWARE ON A MOBILE ELECTRONIC DEVICE VIA A PROXY SERVER

(71) Applicant: BLACKBERRY LIMITED, Waterloo (CA)

(72) Inventors: Timothy Richard Tyhurst, Kitchener (CA); Paul Edward Landry, Waterloo (CA)

(73) Assignee: BLACKBERRY LIMITED, Waterloo (CA)

( \* ) Notice: Subject to any disclaimer, the term of this patent is extended or adjusted under 35 U.S.C. 154(b) by 80 days.

This patent is subject to a terminal disclaimer.

(21) Appl. No.: 16/436,586

(22) Filed: Jun. 10, 2019

(65) Prior Publication Data

US 2019/0294430 A1   Sep. 26, 2019

Related U.S. Application Data

(63) Continuation of application No. 14/669,587, filed on Mar. 26, 2015, now Pat. No. 10,318,267, which is a
(Continued)

(51) Int. Cl.
*G06F 8/65* (2018.01)
*G06F 8/61* (2018.01)
*H04L 29/08* (2006.01)

(52) U.S. Cl.
CPC .................. *G06F 8/65* (2013.01); *G06F 8/61* (2013.01); *H04L 67/10* (2013.01)

(58) Field of Classification Search
None
See application file for complete search history.

(56) References Cited

U.S. PATENT DOCUMENTS 6,151,643 A   11/2000 Cheng et al.
6,484,182 B1  11/2002 Dunphy et al.
(Continued)

FOREIGN PATENT DOCUMENTS

GB   2346716 A   8/2000

OTHER PUBLICATIONS

Jaeger, Trent, and Avi Rubin. "Preserving Integrity in remote file location and retrieval." sndss. IEEE, 1996.
(Continued)

*Primary Examiner* — Philip Wang
(74) *Attorney, Agent, or Firm* — Perry + Currier

(57) ABSTRACT

A system, method and apparatus for installing software at a mobile electronic device are provided, the mobile electronic device enabled for communication with a computing device. A query for available software for installation on the mobile electronic device receiving is received from the computing device, the query directed to a proxy server rather than a public server enabled as a gateway for software downloads. A list of the available software is generated. The list is modified to produce a modified list of approved software. The modified list is transmitted to the computing device such that the approved software can be selected for installation on the mobile electronic device.

18 Claims, 8 Drawing Sheets

Related U.S. Application Data continuation of application No. 12/644,079, filed on Dec. 22, 2009, now abandoned.

(56) References Cited

U.S. PATENT DOCUMENTS

| | | | |
|---|---|---|---|
| 7,409,208 B1 * | 8/2008 | Clare et al. | H04M 3/00 |
| | | | 455/419 |
| 7,587,502 B2 | 9/2009 | Crawford et al. | |
| 7,624,393 B2 | 11/2009 | Egan et al. | |
| 7,627,902 B1 * | 12/2009 | Rive | G06F 21/10 |
| | | | 713/191 |
| 7,657,855 B1 | 2/2010 | Manaker, Jr. et al. | |
| 7,711,586 B2 | 5/2010 | Aggarwal et al. | |
| 7,913,247 B2 | 3/2011 | Diederichs | |
| 8,490,176 B2 | 7/2013 | Book et al. | |
| 2003/0156132 A1 | 8/2003 | Gn et al. | |
| 2003/0188160 A1 * | 10/2003 | Sunder | H04L 67/34 |
| | | | 713/165 |
| 2003/0229890 A1 | 12/2003 | Lau et al. | |
| 2004/0015949 A1 | 1/2004 | Taylor | |
| 2004/0154014 A1 | 8/2004 | Bunger | |
| 2004/0181787 A1 | 9/2004 | Wickham et al. | |
| 2004/0187103 A1 | 9/2004 | Wickham et al. | |
| 2005/0066019 A1 | 3/2005 | Egan et al. | |
| 2005/0154759 A1 | 7/2005 | Hofmeister et al. | |
| 2005/0210459 A1 | 9/2005 | Henderson et al. | |
| 2006/0026304 A1 | 2/2006 | Price | |
| 2007/0038991 A1 | 2/2007 | Schuft et al. | |
| 2007/0157192 A1 | 7/2007 | Hoefler et al. | |
| 2008/0196020 A1 | 8/2008 | Clinton et al. | |
| 2008/0301057 A1 | 12/2008 | Oren | |
| 2008/0301231 A1 * | 12/2008 | Mehta | H04L 67/34 |
| | | | 709/204 |
| 2009/0288079 A1 * | 11/2009 | Zuber | G06F 21/51 |
| | | | 717/176 |
| 2009/0300596 A1 * | 12/2009 | Tyhurst | G06F 8/65 |
| | | | 717/173 |
| 2010/0023933 A1 | 1/2010 | Bryant et al. | |
| 2016/0171065 A1 * | 6/2016 | Kumar | H04L 65/1069 |
| | | | 707/756 |

OTHER PUBLICATIONS

Non-Final Rejection (Office Aclion) dated Oct. 13, 2017, by USPTO, re U.S. Appl. No. 14/669,587.
Non-Final Rejection dated Apr. 27, 2016 for U.S. Appl. No. 14/669,587.
USPTO, Final Rejection, dated Mar. 28, 2018, re U.S. Appl. No. 14/669,587.
USPTO, Notice of Allowance and Fee(s) Due, dated Jan. 24, 2019, re U.S. Appl. No. 14/669,587.
Examination Report dated Feb. 1, 2016 for Canadian Patent Application No. 2726510.
Examination Report, dated Feb. 6, 2018, by CIPO, for Canadian Patent Application No. 2726510.
Final Rejection dated Jul. 24, 2013 for U.S. Appl. No. 12/644,079.
European Patent Application No. 09180323.9 Search Report dated Jun. 8, 2010.

\* cited by examiner

METHOD, SYSTEM AND APPARATUS FOR INSTALLING SOFTWARE ON A MOBILE ELECTRONIC DEVICE VIA A PROXY SERVER

FIELD

The specification relates generally to servers, and specifically to a method, system and apparatus for installing software on a mobile electronic device via a proxy server.

BACKGROUND

Software can be installed at mobile electronic devices using servers that are publicly available, for example, via the Internet. However when a mobile electronic device is associated with an entity, the entity may wish to control which software is installed at the mobile electronic device: an application that the entity might require to be present on the mobile electronic device can be incompatible with publicly available software and hence it is desirable to restrict installation of the publicly available software. For example, the application might work only on a given version of an operating system; hence the entity may wish to prevent installation of a new publicly available operating system. Furthermore, installation of incompatible software can cause a mobile electronic device to become inoperable.

BRIEF DESCRIPTIONS OF THE DRAWINGS

Embodiments are described with reference to the following figures, in which.

DETAILED DESCRIPTION OF THE EMBODIMENTS

Figure 1:
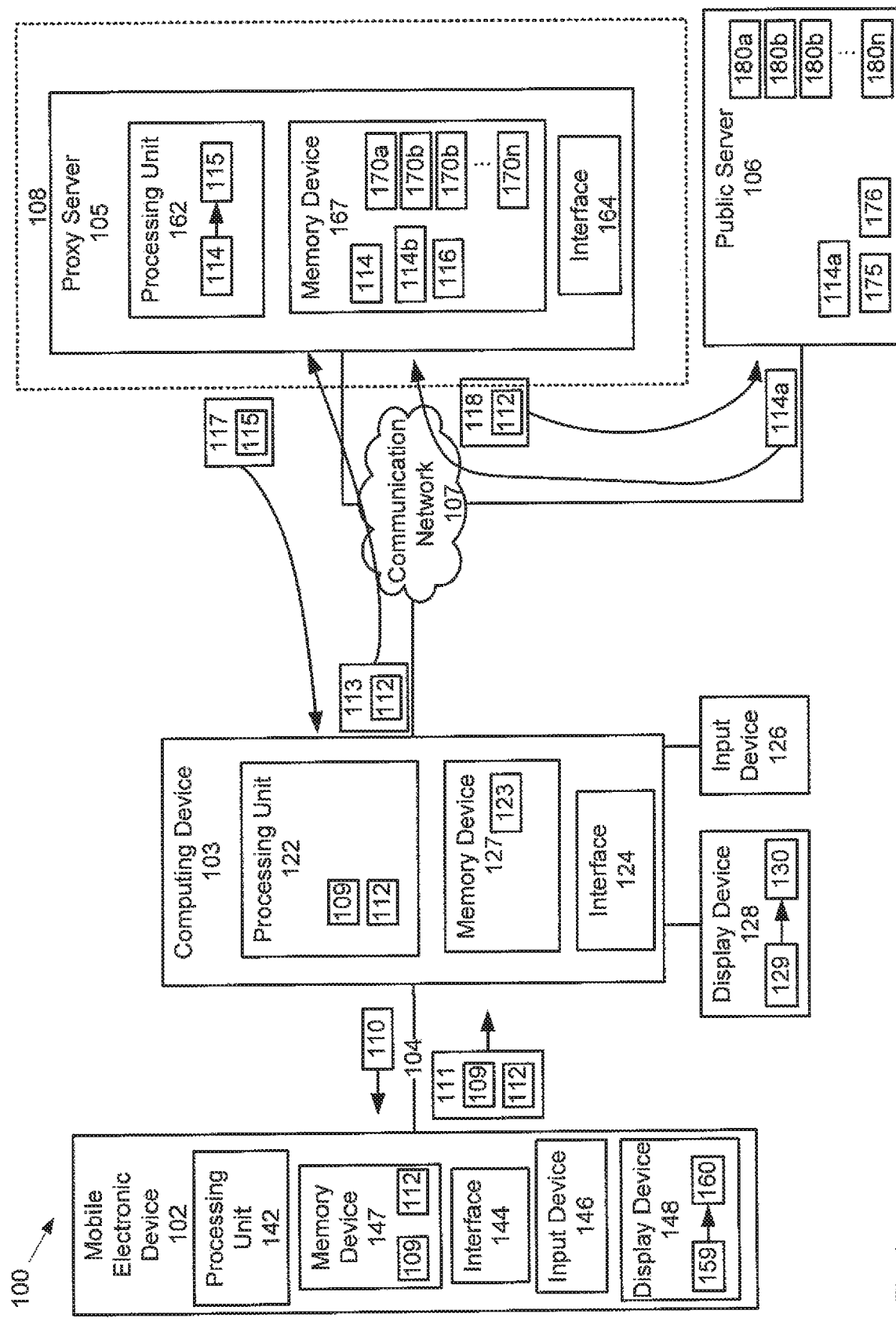
FIG. 1 depicts a block diagram of a system for installing software at a mobile electronic device, according to non-limiting embodiments.

A first aspect of the specification provides a method for installing software at a mobile electronic device, the mobile electronic device enabled for communication with a computing device, the method implementable in a proxy server associated. The method comprises receiving, from the computing device, a query for available software for installation on the mobile electronic device, the query directed to the proxy server rather than a public server enabled as a gateway for software downloads. The method further comprises generating a list of the available software. The method further comprises modifying the list to produce a modified list of approved software. The method further comprises transmitting the modified list to the computing device such that the approved software can be selected for installation on the mobile electronic device.

Generating the list can comprise at least one of retrieving at least a first portion the list from the public server and determining at least a second portion of the list based on software available from resources associated with the proxy server.

The method can further comprise: receiving from the computing device a selection from the modified list; retrieving data files associated with the selection; and transmitting the data files to the computing device for installation on the mobile computing device. Retrieving the data files can comprise at least one of retrieving the data files from the public server and retrieving the data files from resources associated with the proxy server. The method can further comprise storing a subset of the data files at the resources associated with the proxy server, the subset comprising data files retrieved from the public server such that the subset need not be retrieved a second time from the public server.

Modifying the list to produce a modified list of approved software can comprises at least one of: modifying the list based on the rules available to the proxy server; removing software that is not approved from the list; and, adding approved software available from resources associated with the proxy server, but not available from the public server, to the list.

The modified list can comprises at least one of: at least one identifier of the approved software; and at least one network address of a resource from where data files associated with the approved software can be retrieved.

The method can further comprise: authenticating the query; and when the authentication fails, at least one of transmitting an error message to the computing device and redirecting the query to the proxy server, rather than performing the generating step, the modifying step and the transmitting the modified list to the computing device step.

A second aspect of the specification provides a proxy server for installing software at a mobile electronic device, the mobile electronic device enabled for communication with a computing device. The proxy server comprises a processing unit interconnected with a communication interface. The processing unit is enabled to: receive, from the computing device, a query for available software for installation on the mobile electronic device, the query directed to the proxy server rather than a public server enabled as a gateway for software downloads; generate a list of the available software; modify the list based on rules available to the proxy server to produce a modified list of approved software; and transmit the modified list to the computing device such that the approved software can be selected for installation on the mobile electronic device.

The processing unit can be further enabled to: authenticate the query; and when the authentication fails, at least one of transmit an error message to the computing device and redirect the query to the proxy server, rather than performing the generate step, the modify step and the transmit the modified list to the computing device step.

A third aspect of the specification provides method for installing software at a mobile electronic device, the mobile electronic device enabled for communication with a computing device, the method implementable in the computing device. The method comprises: retrieving a network address of a proxy server from the mobile electronic device; querying the proxy server, using the network address, for available software for installation on the mobile electronic device, the querying directed to the proxy server rather than a public server enabled as a gateway for software downloads; receiving a modified list of approved software, from the proxy server, the modified list generated at the proxy, server based on rules available to the proxy server; receiving input data associated with a selection of the approved software from the modified list, for installation on the mobile electronic device; and retrieving data files associated with the selection for installation at the mobile electronic device.

The method can further comprise causing the data files to be installed at the mobile electronic device.

A fourth aspect of the specification provides a computing device for installing software at a mobile electronic device, comprising: a processing unit interconnected with a communication interface and an input device, the communication interface enabled to communicate with the mobile electronic device, the processing unit enabled to: retrieve a network address of a proxy server from the mobile electronic device; query the proxy server, using the network address, for available software for installation on the mobile electronic device, the querying directed to the proxy server rather than a public server enabled as a gateway for software downloads; receive a modified list of approved software, from the proxy server, the modified list generated at the proxy server based on rules available to the proxy server; receive input data associated with a selection of the approved software from the modified list, for installation on the mobile electronic device; and retrieve data files associated with the selection for installation at the mobile electronic device.

A fifth aspect of the specification provides a system for installing software at a mobile electronic device. The system comprises a proxy server enabled to: receive an identifier of the mobile electronic device; generate a list available software available for installation on the mobile electronic device; modify the list based on rules available to the proxy server to produce a modified list of approved software based on rules available to the proxy server; and transmit the modified list such that the approved software on the modified list can be selected for installation on the mobile electronic device. The system further comprises a computing device enabled to: retrieve a network address of the proxy, server from the mobile electronic device; query the proxy server for the available software, using the network address, the query directed to the proxy server rather than a public server enabled as a gateway for software downloads; receive the modified list; receive input data associated with a selection of the approved software from the modified list, for installation on the mobile electronic device; and retrieve data files associated with the selection for installation at the mobile electronic device.

A sixth aspect of the specification provides a computer program product, comprising a computer usable medium having a computer readable program code adapted to be executed to implement a method for installing software at a mobile electronic device, the mobile electronic device enabled for communication with a computing device, the method implementable in a proxy server associated; the method comprising: receiving, from the computing device, a query for available software for installation on the mobile electronic device, the query directed to the proxy server rather than a public server enabled as a gateway for software downloads; generating a list of the available software; modifying the list to produce a modified list of approved software; and transmitting the modified list to the computing device such that the approved software can be selected for installation on the mobile electronic device.

A seventh aspect of the specification provides a computer program product, comprising a computer usable medium having a computer readable program code adapted to be executed to implement a method for installing software at a mobile electronic device, the mobile electronic device enabled for communication with a computing device, the method implementable in the computing device, the method comprising: retrieving a network address of a proxy server from the mobile electronic device; querying the proxy server, using the network address, for available software for installation on the mobile electronic device, the querying directed to the proxy server rather than a public server enabled as a gateway for software downloads; receiving a modified list of approved software; from the proxy server, the modified list generated at the proxy server based on rules available to the proxy server; receiving input data associated with a selection of the approved software from the modified list, for installation on the mobile electronic device; and retrieving data files associated with the selection for installation at the mobile electronic device.

FIG. 1 depicts a system 100 for installing software at a mobile electronic device 102 in communication with a computing device 103, according to non-limiting embodiments. Computing device 103 and mobile electronic device 102 are each enabled for communication with each other via a link 104. Computing device 103 is further enabled for communication with a proxy server 105 and a public server 106 enabled as a gateway for software downloads. Computing device 103, proxy server 105 and public server 106 are each enabled for communication with each other via a communication network 107.

It is generally understood that in exemplary non-limiting embodiments, mobile electronic device 102 and proxy server 105 can each be associated with an entity 108, for example a network operator, a carrier, a business, an organization, a company, or the like. For example, entity 108 can operate proxy server 105, and issue mobile electronic device 102 to a user associated with entity 108 (an employee, a customer, or the like). In general, it is understood that entity 108 prefers that software for installation on mobile electronic device 102 be approved software, for example approved by entity 108. In contrast, in the prior art, software that is not necessarily approved can be retrieved at mobile electronic device 102 via public server 106, for installation at mobile electronic device 102, which can cause mobile electronic device 102 to become at least partially inoperable and/or the unapproved software can be incompatible with applications already installed on mobile electronic device 102. Furthermore, entity 108 may desire to limit/hide certain software upgrades available from public server 106, such as system software upgrades, as entity 108 may have technical support staff trained to provide support on a specific version of software, but aren't yet prepared to support newer versions.

To address these problems, an address 109 of proxy server 105 is stored at mobile electronic device 102, for example in a provisioning process prior to issuing mobile electronic device 102. Address 109 can comprise a network address of proxy server 105. Then, when queries for software installation are being generated, computing device 103 can responsively retrieve address 109 from mobile electronic device 102, via a request 110 transmitted to mobile electronic device 102. Mobile electronic device 102 can then transmit a response 111 to computing device 103, response 111 comprising address 109 and an identifier 112 of mobile electronic device 102, as described in further detail below.

Computing device 103 then receives response 111 and then processes address 109 to transmit a query 113 to proxy server 105 via communication network 107. Query 113 is generally enabled to request a list of available software for installation on mobile electronic device 102, query 113 comprising identifier 112. It is understood that in the prior art, a query for available software would be generally directed to public server 106 rather than proxy server 105, query 113 directed to proxy server 105 due the retrieval of address 109 from mobile electronic device 102. In response to receiving query 113, proxy server 105 generates a list 114 of software available for installation at mobile electronic device 102, and modifies list 114 to produce a modified list 115 of approved software approved by entity 108. In some embodiments, list 114 can be filtered based on rules 116 available to proxy server 105. Furthermore, in some embodiments, proxy server 105 can be enabled to perform some level of authentication/authorization to decide if it should provide service. For example, proxy server 105 can base such a decision on identifier 112 or information derived from identifier 112, such as a user identity. Such authentication/authorization can prevent public access to application and/or data files 170 that are proprietary to entity 108. Hence, when proxy server 105 determines that access is not to be provided, in lieu of response 117, an error message can be returned, and/or redirection to public server 106 can occur.

For example, in some embodiments, list 114 can be at least partially retrieved from public server 106, at which a list 114a of publicly available software can be generated. In these embodiments, proxy server 105 can transmit a query 118 to public server 108 via communication network 107 for a list of software publicly available for installation on mobile communication device 102, query 118 comprising identifier 112. List 114a can then be generated, if not already stored at public server 106, and transmitted back to proxy server 105 and list 114 can be at least partially generated from list 114a. In this manner, proxy server 105 can use the software management and tracking capabilities of public server 106 without having to waste resources managing and tracking all available software for download to mobile electronic device 102.

In further embodiments, list 114 can be at least partially generated from a list 114b of software approved by entity 108 available from resources associated with proxy server 105 and/or entity 108, but not necessarily available from public server 106, as will be described below.

In any event, list 114 can comprise a list of both publicly available software and/or software approved by entity 108 available from resources associated with proxy server 105 and/or entity 108, but not necessarily available from public server 106. List. 114 can then be modified to produce modified list 115, for example using rules 116.

For example, rules 116 can comprise identifiers of software approved for installation on mobile electronic device 102, including but not limited to alphanumeric names, software version numbers, and/or any other suitable identifier. Furthermore, it is understood that rules 116 can comprise identifiers of software available via public server 106 and/or available from resources associated with proxy server 105, though it is understood that identifiers in rules 116 each correspond to approved software and/or software that is to be filtered. For example; in some embodiments, some identifiers 116 can correspond to explicitly disallowed software. For example, one could have a rule of the form "System Software Version 4.5.0 must be used"; but if entity 108 doesn't want to allow a games application to be installed, there can be a separate rule to suppress it, by way of a corresponding identifier and a rule to disallow its installation.

Rules 116 can further comprise identifiers of approved software available for installation on mobile electronic devices other than mobile electronic device 102, and identifier 112 can be used to distinguish between the various approved software. For example identifier 112 can comprise an identification number of mobile electronic device 102, a model number of mobile electronic device 102, an identifier of a manufacturer of mobile electronic device 102, an identifier of a channel or reseller of mobile electronic device 102, a version number of software installed on mobile electronic device 102, such as a version number of an operating system, and the like. In some embodiments, the identification number can be used to retrieve further information about mobile electronic device 102, for example the model number, the version of the operating system etc., by using the identification number to query a database (not depicted) storing such data. In other embodiments, identifier 112 can also be used to retrieve the identity of an end-user associated with mobile electronic device 102; for example, in embodiments where entity 108 comprises a corporation, proxy server 105 can be a element of a corporate server for managing e-mail and the like, and some or all of rules 116 can be associated with a given user or groups of users, rather than directly to a device.

Modified list 115 is then transmitted to computing device 103 in a reply 117, such that the approved software can be selected for installation on mobile electronic device 102, as will be described in further detail below. Hence by modifying list 114 of available software to produce list 115 of approved software, proxy server 105 can enable control over which software can be installed at mobile electronic device 102 without having to duplicate the features of public server 106. Furthermore, changes to the approved software can be made by modifying rules 116, independent of any changes that might occur at public server 106.

It is understood that link 104 can comprise any suitable combination of wired and wireless links desired, such that computing device 103 can communicate with mobile electronic device 102. In some embodiments, link 104 comprises a local link, such that mobile electronic device 102 can communicate with computing device 103 when local to computing device 103. In these embodiments, local link 104 can include, but is not limited to a wired connection, a wireless connection, a cabled connection, a USB (Universal Serial Bus) connection, a WiFi connection, a Bluetooth connection, a near field communication (NEC) connection, and the like or a combination. Other suitable local connections are within the scope of present embodiments.

Communication network 107 can comprise any suitable combination of wired and wireless communication networks as desired, including but not limited to packet based networks, the internet, analog networks, the PSTN (public switched telephone network), cell-phone networks (including but not limited to CDMA, GMS, UTMS, 1×, Edge and the like), WiFi and WiMax networks.

Computing device 103 comprises a processing unit 122 interconnected with a communication interface 124 and a memory device 127, for example via a computing bus (not depicted). Computing device 103 is further associated with an input device 126 and a display device 128 in communication with computing device 103, such that input data can be received at processing unit 122 from input device 126, and display device 128 can be controlled by processing unit 122. As depicted, input device 126 and display device 128 are external to computing device 103, however in other embodiments, computing device 103 can comprise input device 126 and display device 128.

In general, computing device 103 comprises any suitable computing device for communicating with mobile electronic device 102, proxy server 105 and public server 106, including but not limited to any suitable combination of personal computers and laptop computing devices. Other suitable computing devices are within the scope of present embodiments.

Processing unit 122 comprises any suitable processor, or combination of processors, including but not limited to a microprocessor, a central processing unit (CPU) and the like. Other suitable processing units are within the scope of present embodiments. In particular, processing unit is enabled to process a browser application 123 stored in memory device 127, browser application 123 for requesting and processing browser data, for example from remote computing devices via communication network 107.

Communication interface 124 comprises any suitable wired and/or wireless communication interface, or combination of communication interfaces, enabled to communicate with mobile electronic device 102 via link 104 and with proxy server 105 and public server 106 via communication network 107. Accordingly, communication interface 124 is enabled to communicate according to any suitable protocol compatible with link 104, including but not limited to wired protocols, USB protocols, serial cable protocols, wireless protocols, cell-phone protocols, wireless data protocols, Bluetooth protocols, NFC protocols and/or a combination, or the like. Communication interface 124 is further enabled to communicate according to any suitable wired or wireless protocols compatible with communication network 107, including but not limited to packet based protocols, Internet protocols, analog protocols, PSTN protocols, cell phone protocols, WiFi protocols, WiMax protocols and the like, and/or a combination. Other suitable communication interfaces and/or protocols are within the scope of present embodiments.

Input device 126 is generally enabled to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present embodiments.

Memory device 127 can comprise any suitable memory device, including but not limited to any suitable one of or combination of volatile memory, non-volatile memory, random access memory (RAM), read-only memory (ROM), hard drive, optical drive, flash memory, magnetic computer storage devices (e.g. hard disks, floppy disks, and magnetic tape), optical discs, and the like. Other suitable memory devices are within the scope of present embodiments. In particular, memory device 127 is enabled to store browser application 123.

Display device 128 comprises circuitry 129 for generating representations of data, for example a representation 130 of browser application 123, as will be described below. Display device 128 can include any suitable one of or combination of CRT (cathode ray tube) and/or flat panel displays (e.g. LCD (liquid crystal display), plasma, OLED (organic light emitting diode), capacitive or resistive touchscreens, and the like). Circuitry 129 can include any suitable combination of circuitry for controlling the CRT and/or flat panel displays etc., including but not limited to display buffers, transistors, electron beam controllers, LCD cells, plasmas cells, phosphors etc. In particular, display device 128 and circuitry 129 can be controlled by processing unit 122 to generate representation 130.

Mobile electronic device 102 can comprise one or a combination of a PDA, a cell phone, a mobile phone, a mobile communication device, and a portable electronic device. Mobile electronic device 102 comprises a processing unit 142, a communication interface 144, an input device 146, a memory device 147, and a display device 148, all in communication, for example, via a computing bus (not depicted). Each of processing unit 142, communication interface 144, input device 146, memory device 147 and display device 148 can be respectively similar to processing unit 122, communication interface 124, input device 126, memory device 127 and display device 128, described above.

In particular, it is understood that communication interface 144 is enabled to communicate with computing device 103 via link 104 via any suitable combination of wired and wireless protocols, similar to communication interface 124. It is further understood that, in some embodiments, communication interface 144 can be enabled to communicate with remote communication device via at least a wireless network (not depicted), for example a wireless network operated by a carrier network operator.

It is further understood that display device 148 comprises circuitry 159, similar to circuitry 129, for generating representations of data, such as representation 160, as will be described in further detail below.

Proxy server 105 can comprise one or a combination of any suitable computing device and any suitable server. Proxy server 105 comprises a processing unit 162, a communication interface 164, and a memory device 167, all in communication, for example, via a computing bus (not depicted). Each of processing unit 162, communication interface 164, and memory device 167 can be respectively similar to processing unit 122, communication interface 124, and memory device 127, described above.

In particular, it is understood that communication interface 164 is enabled to communicate with computing device 103 and public server 106 via communication network 107 via any suitable combination of wired and wireless protocols, similar to communication interface 124. It is further understood that, communication interface 164 can be enabled to communicate with other resources associated with proxy server 105 and/or entity 108 via communication network 107, including but not limited to databases, external memory devices, and the like.

In yet further embodiments, proxy server 105 can store data files 170a, 170b, 170c . . . 170n (collectively data files 170 and generically a data file 170) associated with software available for download to mobile electronic device 102. In general it is understood that data files 170 are each associated with approved software as data files 170 are stored on resources associated with proxy server 105. In other embodiments, at least a portion of data files 170 can be stored on other resources associated with proxy server 105, and/or entity 108, for example a database or software server in communication with communication network 107. Such resources associated with proxy server 105 can be remote from proxy server 105.

Public server 106 can comprise one or a combination of any suitable computing device and any suitable server. Though not depicted, it is understood that public server 106 comprises a processing unit, a communication interface, and a memory device, all in communication, for example, via a computing bus, which can be can be respectively similar to processing unit 122, communication interface 124, and memory device 127, described above. In particular, public server 106 is enabled as a gateway for managing downloads of software available to be installed on mobile electronic device 102 and alternatively on other electronic devices. Public server 106 is further enabled to manage and track software available for download to mobile electronic device 102.

In some embodiments, public server 106 is enabled to store a software loading application 175, available for download to computing device 103, software loading application 175 for downloading software to computing device 103, once installed thereupon, software downloaded from network resources, and causing downloaded software to be installed at mobile electronic device 102.

In some embodiments, public server 106 is further enabled to store browser data 176, which can be downloaded to computing device 103 and displayed within a representation of browser application 123 on display device 128. Browser data 176 can be requested by computing device 103 when browsing application 123 is being processed. In some of these embodiments, as will be described below, browser data 176 can be enabled to initiate download of application 175 to computing device 103.

In yet further embodiments, public server 106 can store data files 180a, 180b, 180c . . . 180n (collectively data files 180 and generically a data file 180) associated with software available for download to mobile electronic device 102. In other embodiments, at least a portion of data files 180 can be stored remotely, for example a database or software server in communication with communication network 107.

Figure 2:
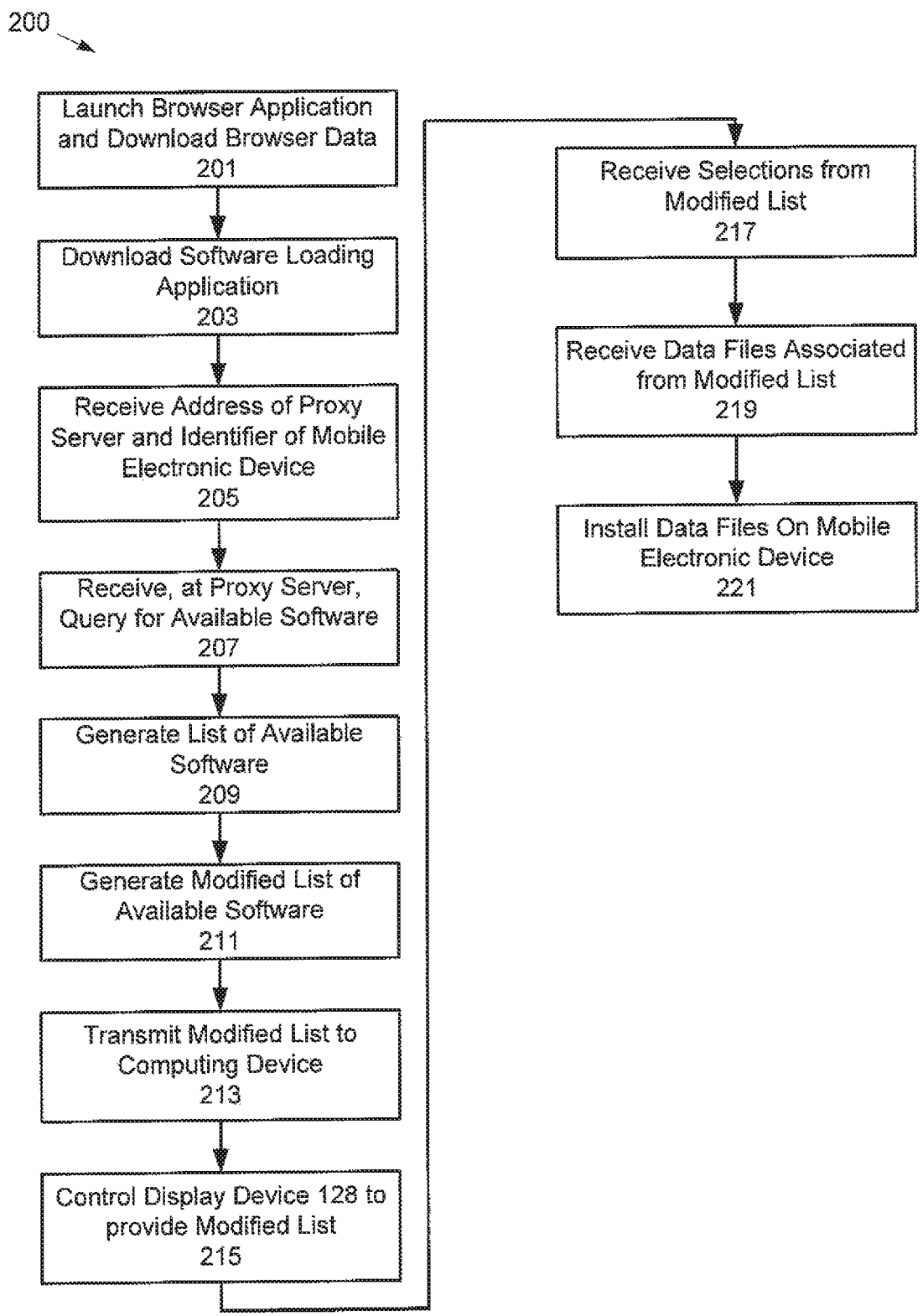
FIG. 2 depicts a flowchart of a method for installing software at a mobile electronic device, according to non-limiting embodiments.

Attention is now directed to FIG. 2 which depicts a method 200 for installing software at a mobile electronic device enabled for communication with a computing device, in order to assist in the explanation of method 200, it will be assumed that method 200 is performed using system 100. Furthermore, the following discussion of method 200 will lead to a further understanding of system 100 and its various components. However, it is to be understood that system 100 and/or method 200 can be varied, and need not work exactly as discussed herein in conjunction with each other, and that such variations are within the scope of present embodiments.

In method 200, it is understood that mobile electronic device 102 is in communication with computing device 103 via link 104 (e.g. link 104 has been established and/or mobile electronic device 102 is connected to computing device 103.

At step 201, browser application 123 is processed by processing unit 122 at computing device 103 and browser data 176 is requested from public server 106, for example via a request (not depicted) transmitted to public server 106 via communication network 107. In general it is understood that by requesting browser data 176, computing device 103 is initiating a process for downloading of software to mobile electronic device 102. For example, computing device 103 can receive an address of public server 106 via input device 126 and/or data stored in memory device 127 (e.g. in a "favourites" folder) such that public server 106 can be queried.

Figure 3:
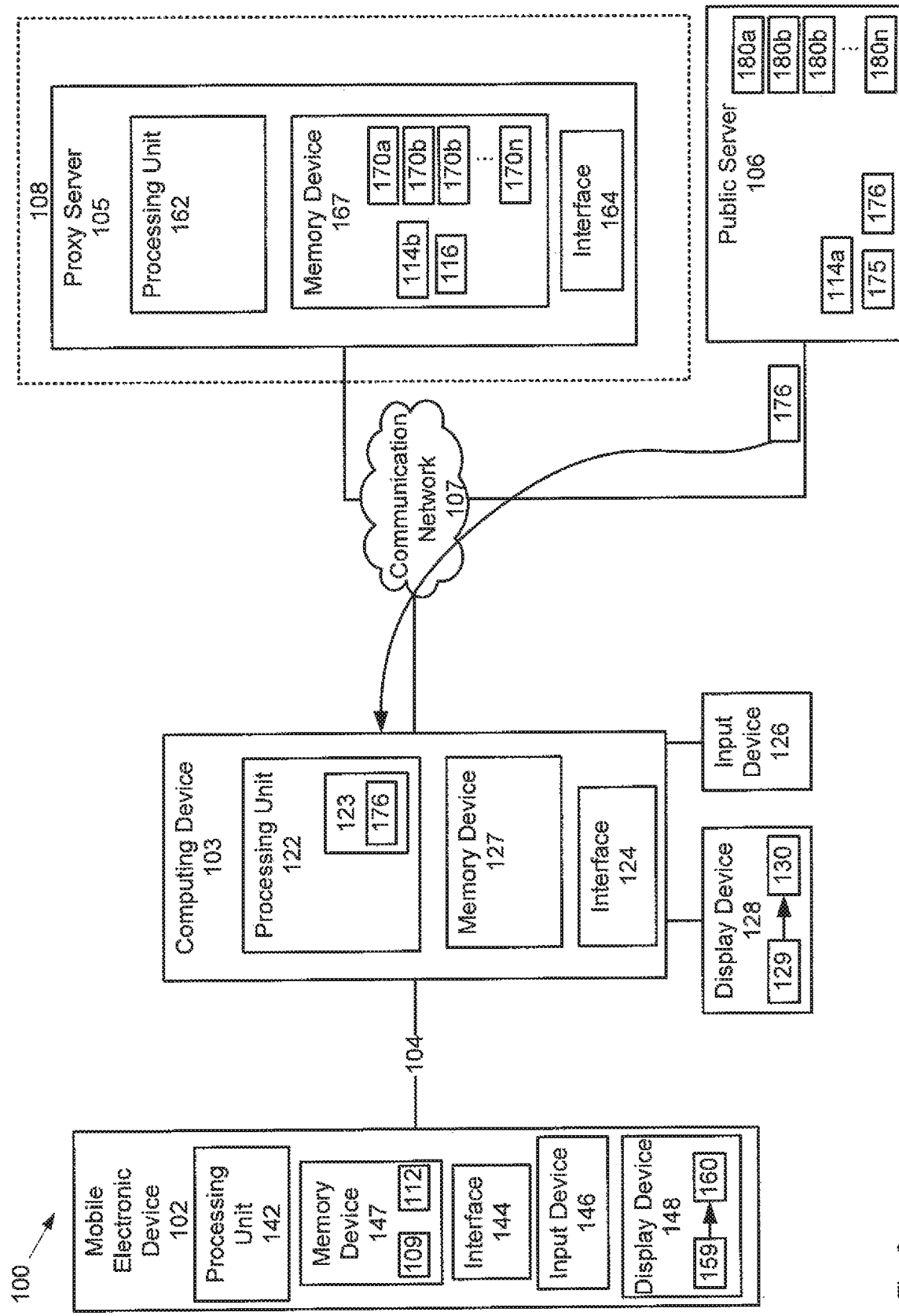
FIG. 3 depicts a block diagram of a system for installing software at a mobile electronic device, according to non-limiting embodiments.
Figure 4:
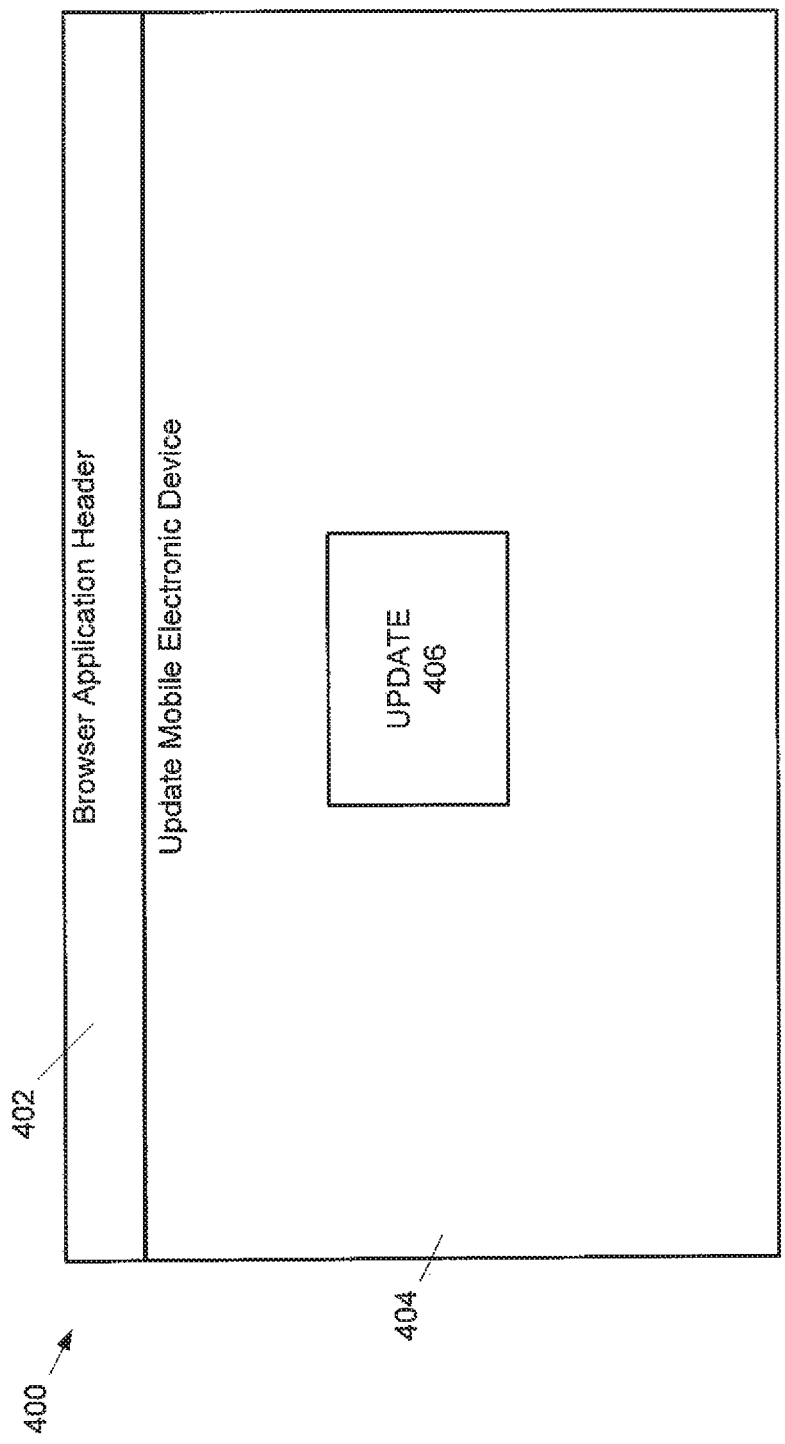
FIG. 4 depicts a representation of a browser application for initiating installation of software at a mobile electronic device, according to non-limiting embodiments.

Furthermore, as depicted in FIG. 3, which is substantially similar to FIG. 1 with like elements having like numbers, it is understood that browser data 176 is being provided within browser application 123, and display device 128 is being controlled to provide a representation 400, as depicted in FIG. 4, of browser application 123 and browser data 176. Non-limiting exemplary embodiments of representation 400 depicted in FIG. 4 can comprise a header 402, a body 404 and a virtual "UPDATE" button 406. In general, the body 404 and button 406 comprises a representation of browser data 176. In some embodiments, representation 130 comprises representation 400.

Figure 5:
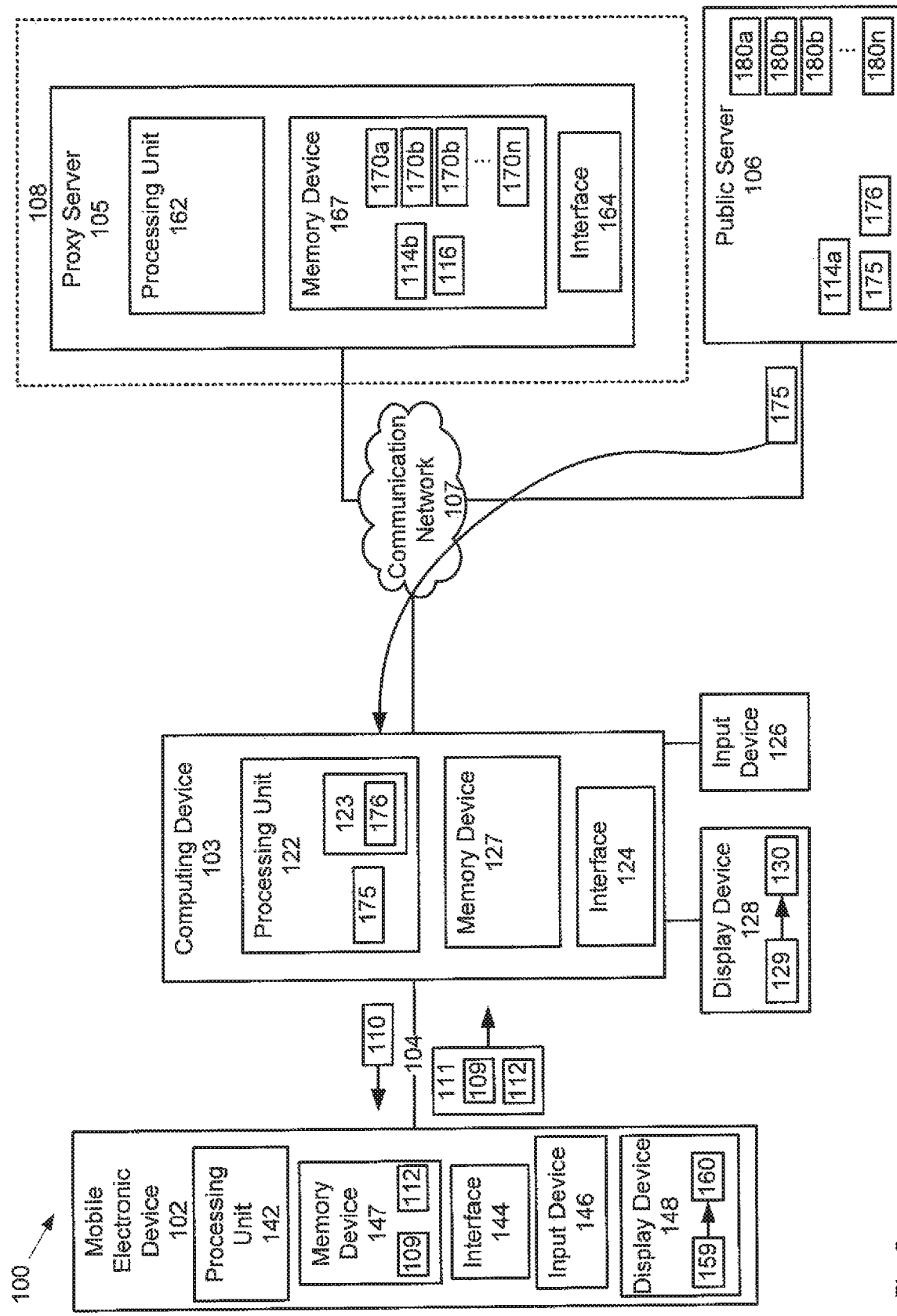
FIG. 5 depicts a block diagram of a system for installing software at a mobile electronic device, according to non-limiting embodiments.

At step 203, actuation of button 406 is detected and in response software loading application 175 is downloaded from public server 106. For example, browser data 176 can comprise instructions for causing software loading application 175 to be downloaded from public server 106 upon actuation of button 406. It is understood that in some embodiments, software loading application 175 is launched once downloaded, as depicted in FIG. 5, substantially similar to FIG. 1 with like elements having like numbers.

At step 205, software downloading application 175 causes query 110 to be transmitted to mobile electronic device 102, as described above, such that response 111 comprising address 109 and identifier 112 are received. Address 109 is processed by computing device 103 to direct query 113 to proxy server 105 rather than public server 106.

At step 207, performed at proxy server 105, query 113 for available software, for installation on mobile electronic device 102, is received from computing device 103.

At step 209, proxy server 105 generates list 114 of the available software for download to mobile electronic device 102. As described above, generating list 114 can comprise at least one of retrieving at least a first portion list 114, for example list 114a, from public server 106, and determining at least a second portion of list 114, for example list 114b, based on software available from resources associated with proxy server 105, for example data files 170. It is understood that either of list 114a and list 114b can be maintained at public server 106 and proxy server 105, respectively, and/or generated upon demand by processing data files 180 and data files 170 respectively.

In depicted embodiments, list 114a comprises at least one identifier and/or at least one network address of software associated with data files 180, for example alphanumeric identifiers: "180a", "180b", "180c", and "180n". List 114b comprises at least one identifier and/or at least one network address of software associated with data files 170, for example alphanumeric identifiers: "170a", "170b", "170c", and "170n". Hence, list 114 comprises alphanumeric identifiers: "170a", "170b", "170c", "170n", "180a", "180b", "180c", and "180n".

At step 211, list 114 is modified to produce a modified list 115 of approved software. As described above, list 114 can be modified by at least one of: modifying list 114 based on rules 116; removing software that is not approved from list 114; and adding to list 114 approved software available from resources associated with proxy server 105, but not available from the public server, such as software associated with data files 170. Furthermore, it is understood that modified list 115 comprises at least one of: at least one identifier of the approved software; and at least one network address of a resource from where data files associated with the approved software can be retrieved, for example a network address of proxy server 105 and/or a network address of public server 106 and/or a network address of another resource from where data files associated with the approved software can be retrieved.

Hence, for example, rules 116 can indicate that: a. software stored at resources associated with proxy server 105 is approved software; and b. that only software associated with data files 180b, 180n are approved. Thus, in exemplary embodiments, modified list 115 comprises alphanumeric identifiers: "170*a*", "170*b*", "170*c*", "170*n*", "180*b*", and "180*n*".

At step 213, modified list 115 is transmitted to computing device 103 via communication network 107, such that the approved software can be selected for installation on mobile electronic device 102.

Figure 6:
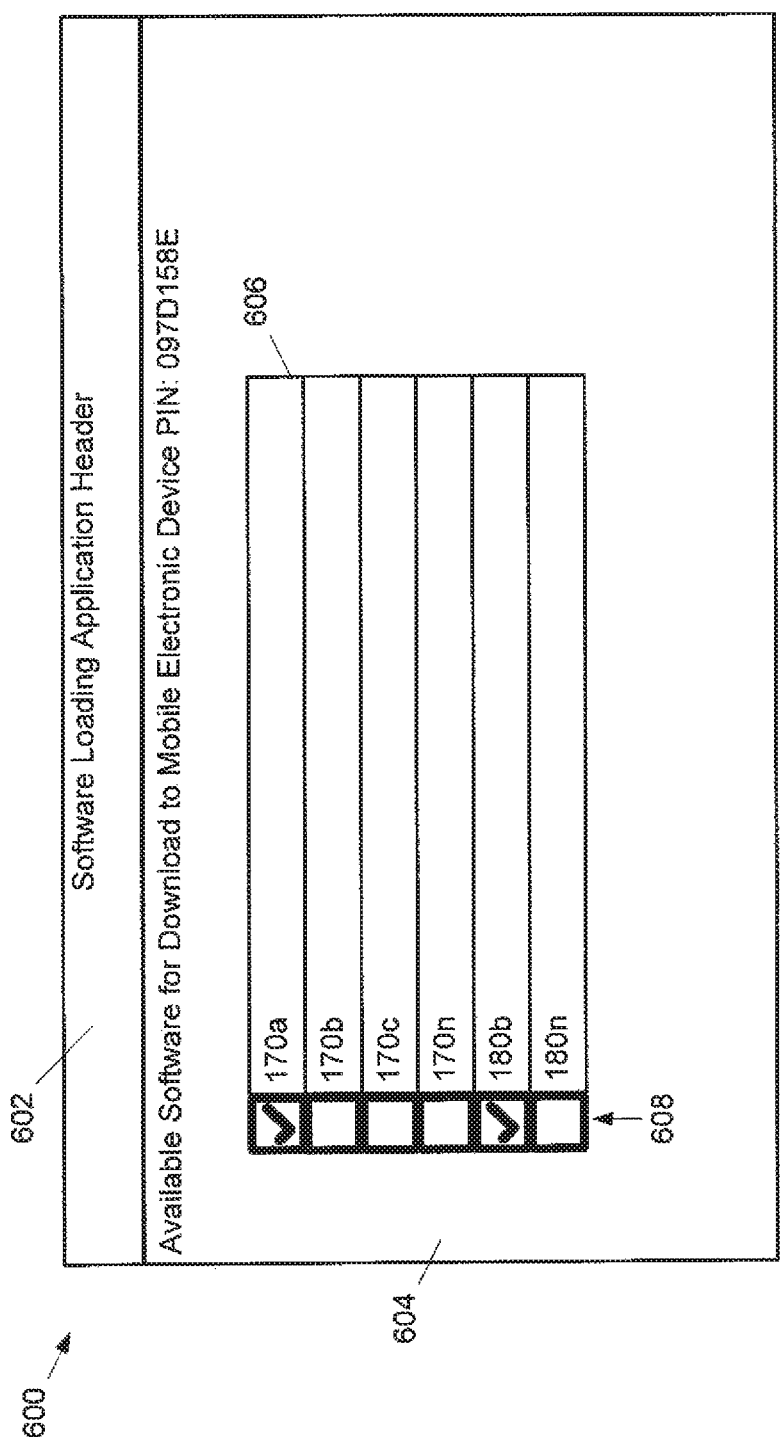
FIG. 6 depicts a representation of a software loading application, according to non-limiting embodiments.

At step 215, display device 128 is controlled by processing unit 122 to provide a representation 600 of software loading application 175, representation 600 comprising a header portion 602, a body portion 604, and a representation 606 of modified list 115, as depicted in FIG. 6. Representation 606 comprises identifiers of the approved software, identifiers "170*a*", "170*b*", "170*c*", "170*n*", "180*b*", and "180*n*" each corresponding to approved software. For convenience identifiers of approved software in representation 606 each comprise an alphanumeric identifier of corresponding data files, 170*a*, 170*b*, 170*c*, 170*n*, 180*b*, and 180*n*, though it is understood that more than one data file 170, and/or more than one data file 180, can correspond to a single approved software application.

Representation 606 further comprises respective checkboxes 608 associated with (e.g. adjacent to) each identifier, which can all initially be checked or unchecked, as desired. The state of a given checkbox 608 can be changed from checked to unchecked, or vice versa, upon receiving input data from input device 126 indicating that a given checkbox 608 has been actuated. For example, a pointing device can be used to select a given checkbox 608 and change its state. In any event, a checked checkbox 608 can indicate that approved software associated with the adjacent identifier has been selected for download. For example, in depicted embodiments, approved software associated with identifiers "170*a*" and "180*b*" have been selected. In yet further embodiments, modified list 115 can comprise processing instructions and/or embedded logic for instructing software loading application 175 to prevent some checkboxes 608 from being unchecked; that is, entity 108 could require that certain data files 170/180 be loaded onto mobile electronic device 102.

Figure 7:
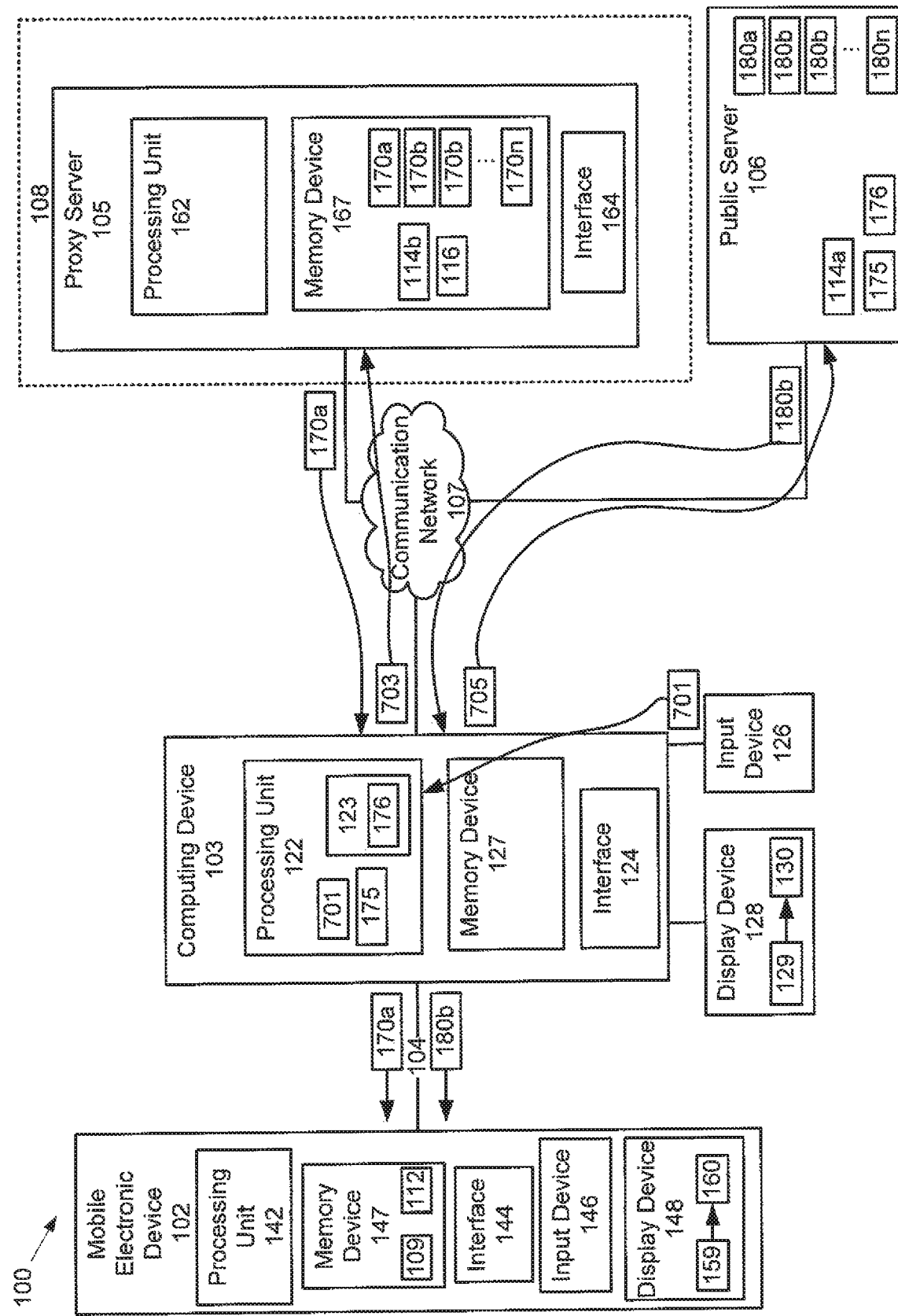
FIGS. 7 and 8 depict a block diagram of a system for installing software at a mobile electronic device, according to non-limiting embodiments.

In any event, returning to FIG. 2, at step 217, selections 701 from modified list 115 are received, at step 219, and data files associated with the selection are retrieved, for example data files 170*a*, 180*b*. This is illustrated in FIG. 7, substantially similar to FIG. 1, which like elements having like numbers, in which a request 703 for data file 170*a* is transmitted to proxy server 105, and a request 705 for data file 180*b* is transmitted to public server 180*b*. Each of proxy server 105 and public server 106 responds by transmitting respective data files 170*a*, 180*b* back to computing device 103. As well, in some embodiments, retrieval of data files 170 and 180 can optionally require authorization; for example, access to such data files 170 can be restricted to mobile electronic devices "known" to the proxy server 105 according to identifier 112. In embodiments where authorization is not successful, an error message can be returned in lieu of data file 170*a*. Then, at step 221, data files associated with the selection are installed on mobile electronic device 102. In some embodiments, computing device 103 can be enabled to manage the software download, while in other embodiments the software download can be managed by a combination of computing device 103 and proxy server 105.

Figure 8:
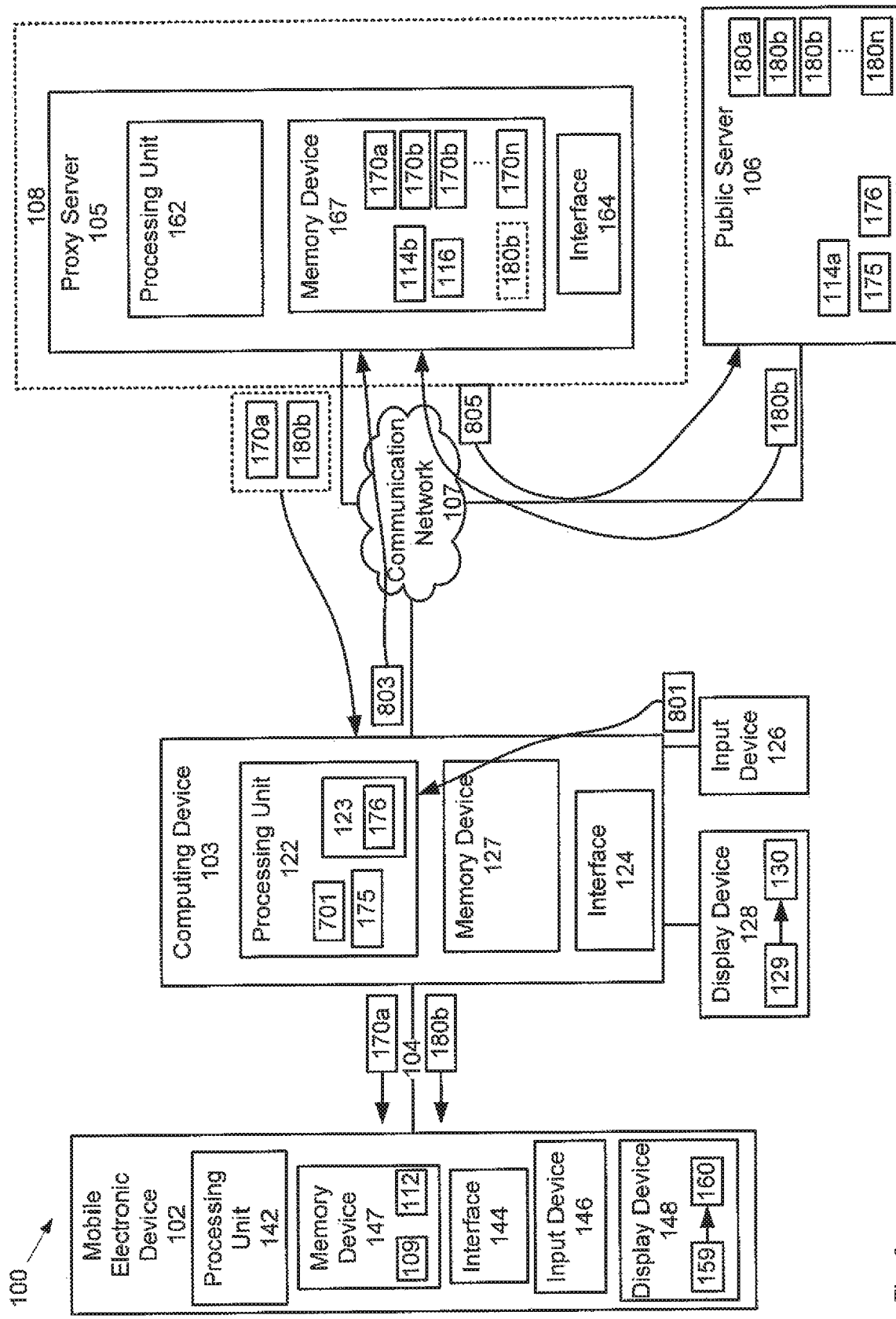

For example, in embodiments where computing device 103 manages the software download, step 217 can comprise receiving the selections from modified list 115 at processing unit 122 via input data 801 received at input device 115, and transmitting a request 803 for data files 107*a*, 108*b* to proxy server 105, as depicted in FIG. 8 (substantially similar to FIG. 1, with like elements having like numbers). In these embodiments, it is understood that all requests for software are to proceed via proxy server 105, and hence modified list 115 only optionally includes addresses of resources from where software can be retrieved. Step 219 can then comprise, upon receipt of request 803, proxy server 105 retrieving the appropriate data files. For example, data file 180*b* can be retrieved from public server 106 via a request 805, and data file 170*a* can be retrieved from memory device 167. In some embodiments, where public server 106 does not store data file 180*b*, data file 180*b* can be in turn requested and received from any suitable resource known to public server 106. Hence, public server 106 can in turn act as a proxy for retrieving software. Alternatively, if list 114*a* included at least one network address of a resource from where data file 180*b* could be retrieved, proxy server 105 can request data file 180*b* directly from the resource.

In any event, each of proxy server 105 then transmits respective data files 170*a*, 180*b* back to computing device 103, which then causes data files 170*a*, 180*b* to be downloaded to mobile electronic device 102 via link 104 for installation, either separately or in a bundle, as desired. Mobile electronic device 102 then receives data files 170*a*, 180*b* and installs them, either under control of computing device 103 via link 104 or upon receipt.

In some of these embodiments, once data file 180*b* is received at proxy server 105, proxy server 105 can cause data file 180*b* to be stored in memory device 167, or any other suitable resource associated with proxy server 105 such that data file 180*b* need not be retrieved a second time from public server 106, for example if requested by another computing device in another software download process. Indeed, any suitable subset of data files retrieved from public server 106 can be stored at proxy server 105 to prevent a second retrieval.

In any event, by storing a network address of a software downloading proxy server at a mobile electronic device, which is retrieved by a computing device managing the software downloads, software download requests can be redirected to the proxy server rather than a public server. The proxy server can retrieve lists and/or identifiers of software available for download via the public server and then filter the list so that it contains only identifiers of approved software. Furthermore, the proxy server can authenticate the requests and alternatively provide error messages if authentication fails or redirect the requests to the public server. Approval of software can be ongoing and indications of approved software can be stored in rules at the proxy server. The proxy server can also augment the list to add approved software that is available through the proxy server but not the public server. The modified list can then be transmitted to the computing device, selections can be made from the modified list and then the selected approved software can be downloaded and installed on the mobile electronic device. Hence, control of software installed on the mobile electronic device can be implemented via the proxy server, as access to the public server for downloading software is redirected through the proxy server.

Those skilled in the art will appreciate that in some embodiments, the functionality of mobile electronic device 102, computing device 103, proxy server 105 and public server 106 can be implemented using pre-programmed hardware or firmware elements (e.g., application specific integrated circuits (ASICs), electrically erasable programmable read-only memories (EEPROMs), etc.), or other related components. In other embodiments, the functionality of mobile electronic device 102, computing device 103, proxy server 105 and public server 106 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Alternatively, the computer-readable program code could be stored remotely but transmittable to these components via a modem or other interface device connected to a network (including, without limitation, the Internet) over a transmission medium. The transmission medium can be either a non-wireless medium (e.g., optical and/or digital and/or analog communications lines) or a wireless medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. A proxy server, comprising:
   a memory;
   a communication interface;
   a processing unit connected with the communication interface and the memory, the processing unit configured to:
      receive, via the communication interface, a query for available software for installation on a mobile electronic device, the query directed to the proxy server according to a network address of the proxy server stored in the mobile electronic device;
      in order to generate a list of the available software, retrieve at least a first portion of the list from a public server that is publicly accessible, and determine at least a second portion of the list based on software available from resources associated with the proxy server;
      modify the list to produce a modified list of approved software by way of rules available to the proxy server, the rules comprising identifiers of at least one of approved software or disallowed software; and
      transmit the modified list such that the approved software can be selected for installation on the mobile electronic device.

2. The proxy server of claim 1, wherein the resources associated with the proxy server include the memory.

3. The proxy server of claim 1, wherein the query for available software includes an identifier of the mobile electronic device; and
   wherein the processing unit is configured, in order to retrieve the first portion of the list from the public server, to transmit a request to the public server, the request containing an identifier of the mobile electronic device.

4. The proxy server of claim 1, wherein the rules include, in association with at least one of the identifiers, an identifier of the mobile electronic device.

5. The proxy server of claim 1, wherein the identifiers of approved software or disallowed software each include at least one of a software name or a version number.

6. The proxy server of claim 1, wherein the processing unit is configured to receive the query from a computing device associated with the mobile electronic device; and to transmit the modified list to the computing device for display.

7. A method in a proxy server for installing software at a mobile electronic device, the method comprising:
   receiving, at the proxy server, a query for available software for installation on the mobile electronic device, the query directed to the proxy server according to a network address of the proxy server stored in the mobile electronic device;
   generating a list of the available software by retrieving at least a first portion of the list from a public server that is publicly accessible, and determining at least a second portion of the list based on software available from resources associated with the proxy server;
   modifying the list to produce a modified list of approved software by way of rules available to the proxy server, the rules comprising identifiers of at least one of approved software or disallowed software; and
   transmitting the modified list such that the approved software can be selected for installation on the mobile electronic device.

8. The method of claim 7, wherein the resources associated with the proxy server include a memory of the proxy server.

9. The method of claim 7, wherein the query for available software includes an identifier of the mobile electronic device; and wherein the method further comprises retrieving the first portion of the list from the public server by transmitting a request to the public server, the request containing an identifier of the mobile electronic device.

10. The method of claim 7, wherein the rules include, in association with at least one of the identifiers, an identifier of the mobile electronic device.

11. The method of claim 7, wherein the identifiers of approved software or disallowed software each include at least one of a software name or a version number.

12. The method of claim 7, further comprising receiving the query from a computing device associated with the mobile electronic device; and transmitting the modified list to the computing device for display.

13. A non-transitory computer-readable medium storing computer-readable instructions executable by a processing unit of a proxy server to:
   receive, via a communication interface connected with the processing unit, a query for available software for installation on a mobile electronic device, the query directed to the proxy server according to a network address of the proxy server stored in the mobile electronic device;
   in order to generate a list of the available software, retrieve at least a first portion of the list from a public server that is publicly accessible, and determine at least a second portion of the list based on software available from resources associated with the proxy server;
   modify the list to produce a modified list of approved software by way of rules available to the proxy server, the rules comprising identifiers of at least one of approved software or disallowed software; and transmit the modified list such that the approved software can be selected for installation on the mobile electronic device.

14. The non-transitory computer-readable medium of claim 13, wherein the resources associated with the proxy server include a memory of the proxy server.

15. The non-transitory computer-readable medium of claim 13, wherein the query for available software includes an identifier of the mobile electronic device; and wherein execution of the computer-readable instructions further configures the processing, in order to retrieve the first portion of the list from the public server, to transmit a request to the public server, the request containing an identifier of the mobile electronic device.

16. The non-transitory computer-readable medium of claim 13, wherein the rules include, in association with at least one of the identifiers, an identifier of the mobile electronic device.

17. The non-transitory computer-readable medium of claim 13, wherein the identifiers of approved software or disallowed software each include at least one of a software name or a version number.

18. The non-transitory computer-readable medium of claim 13, wherein execution of the computer-readable instructions further configures the processing unit to receive the query from a computing device associated with the mobile electronic device; and to transmit the modified list to the computing device for display.

* * * * *